United States Patent [19]

Starks et al.

[11] Patent Number: 6,106,597

[45] Date of Patent: Aug. 22, 2000

[54] WAX COMPOSITIONS COMPRISING FATTY ESTER POLY(OXYALKYLENATED) COLORANTS

[75] Inventors: Leonard J. Starks, Duncan; E. Kyle Stephenson; Robert L. Mahaffey, Jr., both of Spartanburg, all of S.C.

[73] Assignee: Milliken & Company, Spartanburg, S.C.

[21] Appl. No.: 09/216,784

[22] Filed: Dec. 18, 1998

[51] Int. Cl.[7] .................. C09D 13/00; C09D 191/06; C09D 191/08; C11C 5/00
[52] U.S. Cl. ................ 106/31.08; 106/272; 44/275
[58] Field of Search .................. 106/272, 31.08; 44/275

[56] References Cited

U.S. PATENT DOCUMENTS

| | | | |
|---|---|---|---|
| 2,392,158 | 1/1946 | Lacey et al. | 260/169 |
| 3,344,098 | 9/1967 | Horiguchi et al. | 260/22 |
| 3,734,857 | 5/1973 | Moiso et al. | 252/51.5 R |
| 4,167,510 | 9/1979 | Brendle | 260/174 |
| 4,342,683 | 8/1982 | Reel et al. | 260/156 |
| 4,602,916 | 7/1986 | Wilson | 8/580 |
| 4,722,738 | 2/1988 | Wilson | 8/527 |
| 4,732,570 | 3/1988 | Baumgartner et al. | 8/506 |
| 4,871,371 | 10/1989 | Harris | 8/403 |
| 5,084,099 | 1/1992 | Jaeger et al. | 106/22 |
| 5,145,573 | 9/1992 | Riedel et al. | 208/14 |
| 5,310,887 | 5/1994 | Moore et al. | 534/729 |
| 5,621,022 | 4/1997 | Jaeger et al. | 523/161 |
| 5,938,828 | 8/1999 | Zhao et al. | 106/31.43 |

*Primary Examiner*—David Brunsman
*Attorney, Agent, or Firm*—Terry T. Moyer; William S. Parks

[57] ABSTRACT

This invention relates to wax formulations comprised of specific poly(oxyalkylenated) colorants having fatty ester terminal groups. Preferably the wax formulation is a candle. Such polymeric ester capped colorants provide excellent coloring, decreased migratory properties, and improved balanced burning characteristics over traditional candle colorants and dyestuffs. This invention also concerns methods of making the aforementioned colored candle formulations as well as other colored wax articles, such as crayons.

20 Claims, No Drawings

WAX COMPOSITIONS COMPRISING FATTY ESTER POLY(OXYALKYLENATED) COLORANTS

FIELD OF THE INVENTION

This invention relates to wax formulations comprised of specific poly(oxyalkylenated) colorants having fatty ester terminal groups. Preferably the wax formulation is a candle. Such polymeric ester capped colorants provide excellent coloring, decreased migratory properties, and improved balanced burning characteristics over traditional candle colorants and dyestuffs. This invention also concerns methods of making the aforementioned colored candle formulations as well as other colored wax articles, such as crayons.

BACKGROUND OF THE PRIOR ART

All of the patents cited throughout this specification are hereby entirely incorporated herein.

Historically, solvent dyes have been utilized as colorants within waxes, particularly candles. Although these dyes provide good coloring throughout the wax medium, solvent dyes are difficult to handle (powder or dust form), easily stain a myriad of substrates (including a colorist's skin), migrate out of hardened wax to discolor its storage wrapper or its handler's skin, clog burning candle wicks with solid particulate dye, and the like. It is therefore highly desirable to find effective alternatives to such poorly performing wax dyes. There exists a need then to produce a dye which provides effective, thorough, and homogeneous colorations to wax, is easy to handle, will not migrate out of hardened wax, and will not clog a candle wick with solid particles.

It has been found that the utilization of ester capped polyoxyalkylene colorants provide all of the requisite beneficial properties outlined above which are desirable within wax compositions, particularly within candles. Such colorants are present in a neat liquid state at 25° C. which thus facilitates handling and substantially eliminates any wick clogging problems. Furthermore, such colorants are extremely stable when dispersed within a hardened wax medium and therefore cannot migrate out of solution. Also, an additive, such as stearic acid, may be introduced within such wax compositions in order to produce a crayon composition which exhibits the same types of beneficial properties as outlined above for candles, except for the non-clogging characteristics of a wick.

Ester capped polyoxyalkylene colorants are known as fugitive tints for certain textiles, in particular to color code threads during production and/or finishing operations. For example, U.S. Pat. No. 4,167,510, to Brendle discloses the same ester capped colorants as used in the present candle compositions but for use in textile and thread tinting applications. Patentee does not discuss nor allude to any other coloring methods other than textiles for his ester capped colorants. Other possible esterified colorants have been taught within U.S. Pat. No. 4,871,371, to Harris; however, these colorants are utilized solely for the purpose of coloring aqueous or non-aqueous liquids, not waxes, and do not require a fatty acid moiety. Patentee does disclose the addition of alkoxylated fatty acids as diluents for his colorants, but makes no mention of a fatty acid group on the colorant itself. Esterified polymeric colorants within liquid petroleum or mineral oil compositions are taught within U.S. Pat. No. 3,734,857, to Moiso et al., and U.S. Pat. No. 5,145,573, to Riedel et al.; however, the possible esters within these references are limited to short chain ($C_1$–$C_4$) moieties. Therefore these patents neither teach nor fairly suggest the specific candle compositions of the present invention.

OBJECTS OF THE INVENTION

It is therefore an object of this invention to provide a non-staining, non-migrating, non-wick-clogging liquid colorant for utilization within a wax candle composition. A further objective of this invention is to provide a candle which is produced through the utilization of a liquid colorant without the need for volatile organic solvents (such as xylene, toluene, and the like). Still another object of the invention is to produce a colored wax composition which will not stain a handler's skin or discolor its storage wrapper.

SUMMARY OF THE INVENTION

The present invention is thus a colored wax composition comprising polyoxyalkylenated fatty acid-ester capped colorants. The term wax is intended to encompass any wax or wax-like substance in which unmodified reactive dyes are substantially insoluble. Waxes are generally defined as compositions comprising saturated fatty (high molecular weight) hydrocarbons. As will be well understood and appreciated by one of ordinary skill in this art, the term wax is not limited to compositions comprising only such saturated fatty (high molecular weight) hydrocarbons as myriad additives, such as plasticizers and the like, and impurities, including naturally produced and occurring impurities, are also present in various proportions within wax or wax-like compositions, particularly within candle and crayon formulations. More specific types of such waxes include mineral waxes, such as paraffin, montan, ozokerite, microcrystalline wax, earth wax, and the like; animal waxes, such as beeswax, waspwax, Chinesewax (insectwax), and the like; vegetable waxes, such as carnauba, sugarcane wax, candelilla, flax wax, and the like; and synthetic waxes, such as Fischer-Tropsch wax, polyethylene wax, and the like. Such waxes generally melt at temperatures ranging from about 50 to about 70° C. For instance, paraffin wax, which is the most prevalent and most versatile type of wax, melts in a range of between about 55 and about 65° C. Other types of waxes (called additive waxes) may be added to candle and/or crayon compositions to produce differing effects (such as color variations, for example) and may alter the melting point of the base wax composition to a certain degree. The particular wax articles encompassed within this invention solid wax implements, such as candles, crayons, ear plugs, and the like.

Accordingly, this invention includes a wax composition comprising a wax; and a colorant defined by Formula (I)

$$R\{A\text{—}[(B)_n R^1]_m\}_x \qquad (I)$$

wherein

R is an organic chromophore;

A is a linking moiety in said chromophore selected from the group consisting essentially of N, O, S, $SO_2N$, or $CO_2$;

B is selected from one or more alkyleneoxy constituents containing from 2 to 4 carbon atoms;

n is an integer of from 2 to about 100;

m is 1 when A is O, S, or $CO_2$, and m is 2 when A is N or $SO_2N$;

x is an integer of from 1 to about 5; and $R^1$ is a $C_8$ to about $C_{20}$ fatty acid moiety.

The organic chromophore is, more specifically, one or more of the following types of compounds: azo, diazo, disazo, trisazo, diphenylmethane, triphenylmethane, xanthene, nitro, nitroso, acridine, methine, styryl, indamine, thiazole, oxazine, or anthraquinone. Preferably, R is one or more of azo, diazo, triphenylmethane, methine, or thiazole based compounds. Group A is present on group R and is utilized to attach the polyoxyalkylene constituent to the organic chromophore. Nitrogen is the preferred linking moiety. The polyoxyalkylene group is generally a combination of ethylene oxide and propylene oxide monomers. Preferably propylene oxide is present in the major amount, and most preferably the entire polyoxyalkylene constituent is propylene oxide.

The preferred number of moles (n) of polyoxyalkylene constituent per ester-capped chain is from 2 to 15, more preferably from 4 to 10. Also, preferably two such ester capped chains are present on each polymeric colorant compound (x, above, is preferably 2). In actuality, the number of moles (n) per ester-capped chain is an average of the total number present since it is very difficult to control the addition of specific numbers of moles of alkyleneoxy groups. Furthermore, the preferred fatty acid chain length is from $C_{12}$–$C_{18}$; more preferably from $C_{14}$ to $C_{18}$; and most preferably $C_{18}$.

The amount of colorant added depends largely on the intended end use. For example, if the colored wax composition is a crayon, the colorant is generally added in an amount from about 0.01 to about 15% by weight of the total wax composition in order to introduce sufficient colorant not only to color the wax composition, but also to effectuate a proper transfer of the colorant to a writing surface. Preferably, the required amount is from about 0.1 to about 12% by weight; more preferably from about 1 to about 12%; and most preferably from about 5 to about 10.5%. If the wax composition is a candle, as merely an example, the amount of colorant added is generally from about 0.001 to about 35 by weight of the total wax composition; preferably from about 0.01 to about 2%; more preferably from about 0.01 to about 1.0%; and most preferably from about 0.01 to about 0.1%.

The invention also encompasses a method of producing a colored wax article comprising the sequential steps of (a) providing a solution of molten wax;

(b) introducing into said molten wax a colorant defined by Formula (I)

$$R\{A[(B)_n R^1]_m\}_x \qquad (I)$$

wherein

R is an organic chromophore;

A is a linking moiety in said chromophore selected from the group consisting essentially of N, O, S, $SO_2N$, and $CO_2$;

B is selected from one or more alkyleneoxy constituents containing from 2 to 4 carbon atoms;

n is an integer of from 2 to about 100;

m is 1 when A is O, S, or $CO_2$, and m is 2 when A is N or $SO_2N$;

x is an integer of from 1 to about 5; and $R_1$ is a $C_8$ to about $C_{20}$ fatty acid moiety, thereby producing a colored wax composition;

(c) pouring said colored wax composition into a mold; and (d) allowing sufficient time for said colored wax composition to cool within said mold.

The preferred article to be manufactured in this inventive process is a candle; however, as noted above, crayons, ear plugs, and the like, may also be produced by this method. Any other standard wax composition additives, such as fatty acids, resins, preservatives, wax colorants other than the currently utilized ester capped polymeric colorants, pigments, surfactants, and antistatic compounds may be incorporated within the inventive wax composition or utilized within the inventive production method. Of particular interest is the utilization of a diluent surfactant, for example mineral oil or a substituted or unsubstituted sorbitan monoester, such as sorbitan monooleate (Span® 80, from Imperial Chemical) and/or ethoxylated sorbitan monooleate (such as Tween® 80, also available from Imperial Chemical). Such diluent surfactants provide improvements in incorporating the fatty ester polymeric polyoxyalkylenated colorants within the target wax compositions. As above, the amount of surfactant added will depend primarily on the amount of colorant added and thus is highly dependent on the intended end use of the colored wax composition. For instance, where such a diluent surfactant is utilized to color a wax candle composition, the surfactant is generally present in a range ot ratios of colorant to surfactant from about 1:1 to about 1:10. Preferably, this ratio is from about 1:1.5 to about 1:7.5; more preferably, from about 1:2 to about 1:5; and most preferably from about 1:2.5 to about 1:3.25.

DESCRIPTION OF THE PREFERRED EMBODIMENT

Without limiting the scope of the invention, the preferred features of the invention are exemplified below.

The preferred esterified colorants are listed below in tabular form and in correlation with Formula (I) listed above (EO is ethyleneoxy and PO is propyleneoxy).

TABLE

Preferred Poly(oxyalkylenated) Colorants

| Col. # | R | A | B (with moles) | $R^1$ | n | m | x |
|---|---|---|---|---|---|---|---|
| 1 | Methine | N | 1EO; 5PO; 3EO | $C_{18}$ | 9 | 2 | 1 |
| 2 | Benzothiazole | N | 1EO; 5PO; 3EO | $C_{18}$ | 9 | 2 | 1 |
| 3 | Triphenylmethane | N | 1EO; 5PO; 3EO | $C_{18}$ | 9 | 2 | 2 |
| 4 | Benzothiazole | N | 3PO | $C_{18}$ | 3 | 2 | 1 |
| 5 | Triphenylmethane | N | 3PO | $C_{18}$ | 3 | 2 | 2 |
| 6 | Methine | N | 1EO; 7.5PO; 2.5EO | $C_{18}$ | 11 | 2 | 1 |
| 7 | Triphenylmethane | N | 1EO; 6.5PO | $C_{18}$ | 7.5 | 2 | 2 |

Production of Esterified Colorants

Initially, the preferred colorants for use in the inventive candle compositions are produced as follows in two separate types of procedures:

A. Esterification of Colorants

EXAMPLE 1

100.00 g of Colorant 1, above, but with an hydrogen in place of the $C_{18}$ fatty acid group of $R^1$, were charged to a reactor with 15.92 triethylamine and 20 mL of tetrahydrofuran (THF). To this mixture were slowly added 47.77 g of stearoyl chloride at room temperature. The resulting mixture was then heated to 40° C. and monitored by infrared (IR) spectroscopy to determine the point in time during the reaction at which the acid chloride peak (1800 nm) disappeared. The mixture was then placed in a separatory funnel in which it was washed with sodium carbonate and water. The organic phase of the separated mixture was then filtered and stripped under vacuum to yield 83.36 g of a yellow liquid polymeric colorant in accordance with Colorant 1 of the TABLE.

EXAMPLE 2

100.00 g of Colorant 2, above, but with an hydrogen in place of the $C_{18}$ fatty acid group of $R^1$, were charged to a reactor with 18.15 triethylamine and 20 mL of tetrahydrofuran (THF). To this mixture were slowly added 81.67 g of stearoyl chloride at room temperature. The resulting mixture was then heated to 40° C. and monitored by infrared (IR) spectroscopy to determine the point in time during the reaction at which the acid chloride peak (1800 cm$^{-1}$) disappeared. The mixture was then placed in a separatory funnel in which it was washed with sodium carbonate and water. The organic phase of the separated mixture was then filtered and stripped under vacuum to yield 150.73 g of a red liquid polymeric colorant in accordance with Colorant 2 of the TABLE.

EXAMPLE 3

100.00 g of Colorant 3, above, but with an hydrogen in place of the $C_{18}$ fatty acid group of $R^1$ were charged to a reactor with 21.82 triethylamine and 20 mL of tetrahydrofuran (THF). To this mixture were slowly added 98.18 g of stearoyl chloride at room temperature. The resulting mixture was then heated to 40° C. and monitored by infrared (IR) spectroscopy to determine the point in time during the reaction at which the acid chloride peak (1800 cm$^{-1}$) disappeared. The mixture was then placed in a separatory funnel in which it was washed with sodium carbonate and water. The organic phase of the separated mixture was then filtered and stripped under vacuum to yield 181.93 g of a blue liquid polymeric colorant in accordance with Colorant 3 of the TABLE.

B. Formation of Colorants After Esterification of Intermediates

EXAMPLE 4

An esterified intermediate was produced by the following method. 84 g of an aniline adduct containing 6 moles of PO was reacted with 110 g of isostearic acid and 2 g of hypophosphorous acid. The resulting mixture was heated to 200° C. for about 15 hours and produced 126.63 g of the compound of formula (I):

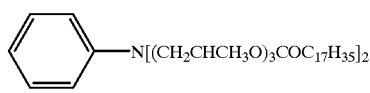

(I)

EXAMPLE 5

An esterified polymeric colorant was then formed by the following method. 75 g of phosphoric acid (85%) was added to 10 g of sulfuric acid (70%). To this mixture was slowly added 13.9 g of 2-amino-4-methyl benzothiazole. This coupler mixture was cooled to 0–5° C. for 1 hour, after which 2.9 g of sodium nitrite was then added. A separate solution containing 29.67 g of the propoxylated (6PO) aniline isostearate intermediate of EXAMPLE 4 was then dissolved in 200 g of water with stirring. The coupler mixture was then added to the intermediate and stirred for one hour at room temperature. The pH of the resulting mixture was then adjusted to 7.0 (caustic soda was utilized) and the mixture was then allowed to separate into distinct phases in a 60° C. oven. The resulting organic phase was filtered and stripped under vacuum to yield 69.54 g of a red liquid polymeric colorant as defined by the formula of Colorant 4 in the TABLE, above.

EXAMPLE 6

A different esterified colorant was prepared by the following method. 50.67 g of the propoxylated (6PO) aniline isostearate intermediate of EXAMPLE 4, 7.46 g of orthoformyl benzenesulfonic acid, sodium salt (OFBSA), 0.76 g of urea, 0.02 g of ammonium meta vanadate (catalyst), and 1.59 g of water were all charged to a reactor with stirring and heated to about 95–100° C. To this mixture was slowly added, by addition funnel, a separate solution containing 2.51 g of hydrogen peroxide (35%) and 7.1 g of water. This new mixture was then allowed to react for 30 minutes. Subsequently, the reacted mixture was placed in a separatory funnel and phase separated in a 60° C. oven. The resultant organic phase was filtered and stripped under vacuum to yield 38.42 g of a blue liquid polymeric colorant as defined by the formula for Colorant 5 in the TABLE, above.

Introduction of Colorants into Candle (or Crayon) Compositions

This process generally entailed adding the colorant (or blend of colorants) to molten wax and stirring (while the solution remained in a molten state) until the wax solution became an homogeneously colored formulation. This liquid wax solution was allowed to cool in a candle mold surrounding a wick, whereupon the wax eventually formed a colored solid candle. Colorants 1 through 3 from the TABLE, above, above, were cut to an absorptivity of about 5.0 in wax through dilution with a sorbitan monooleate diluent surfactant (such as Span® 80, available from Imperial Chemical) prior to their introduction within the molten wax media. Colorants 5 through 7, above, were added directly to the molten waxes at an absorptivity of about 0.1 without the addition of a diluent surfactant.

EXAMPLE 7

0.44 g of the Colorant from EXAMPLE 1 (Colorant 1 from the TABLE, above) were diluted in 1.36 g of Span® 80 and subsequently introduced within 900 g of molten paraffin wax. After mixing, the liquid wax solution became a homogeneous yellow composition. The liquid was then poured into a candle mold with a wick inserted in the middle and subsequently allowed to cool. The resultant homogeneous liquid wax (prior to cooling) exhibited little or no colorant droplets and the colorant was well dispersed throughout the resultant solid wax candle (after cooling). Furthermore, after a storage time of 28 days within a polyethylene wrapper at 25° C., the colorant remained homogeneously dispersed throughout the candle. Additionally, after this storage period, no staining of the wrapper was detected thus indicating no appreciable migration of the colorant from the solid wax medium.

EXAMPLE 8

0.55 g of the Colorant from EXAMPLE 2 (Colorant 2 from the TABLE, above) were diluted in 1.25 g of Span® 80 and subsequently introduced within 900 g of molten paraffin wax. After mixing, the liquid wax solution became a homogeneous red composition. The liquid was then poured into a candle mold with a wick inserted in the middle and subsequently allowed to cool. The resultant homogeneous liquid wax (prior to cooling) exhibited little or no colorant droplets and the colorant was well dispersed throughout the resultant solid wax candle (after cooling). Furthermore, after a storage time of 28 days within a polyethylene wrapper at 25° C., the colorant remained homogeneously dispersed throughout the candle. Additionally, after this storage period, no staining of the wrapper was detected thus indicating no appreciable migration of the colorant from the solid wax medium.

EXAMPLE 9

0.44 g of the Colorant from EXAMPLE 3 (Colorant 3 from the TABLE, above) were diluted in 1.36 g of Span® 80 and subsequently introduced within 900 g of molten paraffin wax. After mixing, the liquid wax solution became a homogeneous blue composition. The liquid was then poured into a candle mold with a wick inserted in the middle and subsequently allowed to cool. The resultant homogeneous liquid wax (prior to cooling) exhibited little or no colorant droplets and the colorant was well dispersed throughout the resultant solid wax candle (after cooling). Furthermore, after a storage time of 28 days within a polyethylene wrapper at 25° C., the colorant remained homogeneously dispersed throughout the candle. Additionally, after this storage period, no staining of the wrapper was detected thus indicating no appreciable migration of the colorant from the solid wax medium.

EXAMPLE 10

0.55 grams of the Colorant of EXAMPLE 5 (Colorant 4 of the TABLE, above) were introduced within 900 grams of molten paraffin wax. After mixing, the liquid wax solution became an homogeneous red composition. The liquid was then poured into a candle mold with a wick inserted in the middle and was then allowed to cool. The homogeneous liquid had little or no colorant droplets and the colorants were well dispersed in the resultant solid wax candle. Furthermore, after a storage time of 28 days within a polyethylene wrapper at 25° C., the colorant remained homogeneously dispersed throughout the candle. Additionally, after this storage period, no staining of the wrapper was detected thus indicating no appreciable migration of the colorant from the solid wax medium.

EXAMPLE 11

0.37 grams of the Colorant of EXAMPLE 6 (Colorant 5 from the TABLE, above) were introduced within 900 grams of molten paraffin wax. After mixing, the liquid wax solution became an homogeneous blue composition. The liquid was then poured into a candle mold with a wick inserted in the middle and was then allowed to cool. The homogeneous liquid had little or no colorant droplets and the colorants were well dispersed in the resultant solid wax candle. Furthermore, after a storage time of 28 days within a polyethylene wrapper at 25° C., the colorant remained homogeneously dispersed throughout the candle. Additionally, after this storage period, no staining of the wrapper was detected thus indicating no appreciable migration of the colorant from the solid wax medium.

EXAMPLE 12

3.0 grams of Colorant 6 of the TABLE, above, were introduced into 33.7 grams of molten paraffin wax. After mixing, the liquid wax solution became an homogeneous yellow composition. The liquid was then poured into a crayon mold and allowed to cool. The homogeneous liquid had little or no colorant droplets and the colorant was well dispersed within the resultant solid wax crayon. Furthermore, the crayon exhibited very good transfer to a paper writing surface.

EXAMPLE 13

3.2 grams of Colorant 7 of the TABLE were introduced into 32.3 grams of molten paraffin wax. After mixing, the liquid wax solution became an homogeneous blue composition. The liquid was then poured into a crayon mold and allowed to cool. The homogeneous liquid had little or no colorant droplets and the colorant was well dispersed within the resultant solid wax crayon. Furthermore, the crayon exhibited very good transfer to a paper writing surface.

C. Comparative Examples

Formation of Comparative Non-esterified Intermediate

EXAMPLE 14

Comparative

A comparative non-esterified intermediate was formed by the following method. 1392 g of PO was bubbled into a reactor containing 724 g of N,N-dihydroxyethylaniline and 24 g of flake KOH at 250° C. and 5 psi until 6 molar equivalents of PO were absorbed. The resulting product is represented by formula (II):

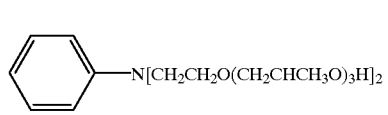

(II)

Formation of Non-esterified Polymeric Colorants

EXAMPLE 15

Comparative

A comparative non-esterified polymeric colorant was produced by the following method. 75 g of phosphoric acid (85%) was added to 10 g of sulfuric acid (70%). To this mixture was slowly added 13.9 g of 2-amino-4-methyl benzothiazole. This coupler mixture was cooled to 0–5° C. for 1 hour, after which 2.9 g of sodium nitrite was then added. A separate solution containing 29.67 g of the propoxylated (6PO) aniline intermediate of EXAMPLE 14 was then dissolved in 200 g of water with stirring. The coupler mixture was then added to the intermediate and stirred for one hour at room temperature. The pH of the resulting mixture was then adjusted to 7.0 (caustic soda was utilized) and the mixture was then allowed to separate into distinct phases in a 60° C. oven. The resulting organic phase was filtered and stripped under vacuum to yield a red liquid non-esterified polymeric colorant.

EXAMPLE 16

Comparative

A different non-esterified polymeric colorant was prepared by the following method. 50.67 g of the propoxylated (6PO) aniline intermediate of EXAMPLE 14, 7.46 g of OFBSA, 0.76 g of urea, 0.02 g of ammonium meta vanadate (catalyst), and 1.59 g of water were all charged to a reactor with stirring and heated to about 95–100° C. for 1 hour. To this mixture was slowly added, by addition funnel, a separate solution containing 2.51 g of hydrogen peroxide (35%) and 7.1 g of water. This new mixture was then allowed to react for 30 minutes. Subsequently, the reacted mixture was placed in a separatory funnel and phase separated in a 60° C. oven. The resultant organic phase was filtered and stripped under vacuum to yield a blue liquid non-esterified polymeric colorant.

Introduction of Comparative Colorants within Candle (or Crayon) Compositions

EXAMPLE 17

Comparative 0.27 grams of the comparative Colorant of EXAMPLE 15 were introduced into 900 grams of molten paraffin wax. After mixing, the liquid wax solution became an heterogeneous red composition. The liquid was then poured into a candle mold with a wick inserted in the middle and was then allowed to cool. The homogeneous liquid had large colorant droplets and the colorants were poorly dispersed in the solid wax candle with the majority of the colorant in the bottom. Furthermore, the colorants also began migrating from the outer walls of the wax candle into its polyethylene wrapper upon contact. After a storage period of 28 days at 25° C., the wrapper was examined further and found to be thoroughly colored while the wax candle exhibited undesirable color variations throughout.

EXAMPLE 18

Comparative 0.20 grams of the Colorant 6 of the TABLE, above, but with the replacement of the $R^1$ group with an hydrogen, were introduced into 900 grams of molten paraffin wax. After mixing, the liquid wax solution became an heterogeneous blue composition. The liquid was then poured into a candle mold with a wick inserted in the middle and was then allowed to cool. The homogeneous liquid had large colorant droplets and the colorants were poorly dispersed in the solid wax candle with the majority of the colorant in the bottom. Furthermore, the colorants also began migrating from the outer walls of the wax candle into its polyethylene wrapper upon contact. After a storage period of 28 days at 25° C., the wrapper was examined further and found to be thoroughly colored while the wax candle exhibited undesirable color variations throughout.

EXAMPLE 19

Comparative 2.2 grams of Colorant 6 of the TABLE, above, but with the replacement of the $R^1$ group with an hydrogen, were introduced into 35.2 grams of molten paraffin wax. After mixing, the liquid wax solution became an heterogeneous yellow composition. The liquid was then poured into a crayon mold and allowed to cool. The heterogeneous liquid contained colorant droplets and the colorant was not well dispersed within the resultant solid wax crayon. The crayon also exhibited a poor, uneven transfer of color to a paper writing surface.

EXAMPLE 20

Comparative 2.6 grams of Colorant 6 of the TABLE, above, but with the replacement of the $R^1$ group with an hydrogen, and 1.3 grams of Span® 80 were introduced into 39.2 grams of molten paraffin wax. After mixing, the liquid wax solution became an heterogeneous yellow composition. The liquid was then poured into a crayon mold and allowed to cool. The heterogeneous liquid contained colorant droplets and the colorant was not well dispersed within the resultant solid wax crayon. The crayon also exhibited a poor, uneven transfer of color to a paper writing surface.

EXAMPLE 21

Comparative 2.1 grams of Colorant 7 of the TABLE, above, but with the replacement of the $R^1$ group with an hydrogen, were introduced into 32.7 grams of molten paraffin wax. After mixing, the liquid wax solution became an heterogeneous blue composition. The liquid was then poured into a crayon mold and allowed to cool. The heterogeneous liquid contained colorant droplets and the colorant was not well dispersed within the resultant solid wax crayon. The crayon also exhibited a poor, uneven transfer of color to a paper writing surface.

EXAMPLE 22

Comparative 2.5 grams of Colorant 7 of the TABLE, above, but with the replacement of the $R^1$ group with an hydrogen, and 1.25 grams of Span(t 80 were introduced into 38.4 grams of molten paraffin wax. After mixing, the liquid wax solution became an heterogeneous yellow composition. The liquid was then poured into a crayon mold and allowed to cool. The heterogeneous liquid contained colorant droplets and the colorant was not well dispersed within the resultant solid wax crayon. The crayon also exhibited a poor, uneven transfer of color to a paper writing surface.

As these results indicate, the ester-capped polyoxyalkylenated polymeric colorants provide superior performance in wax compositions than the non-esterified colorants.

While specific features of the invention have been described, it will be understood, of course, that the invention is not limited to any particular configuration or practice since modification may well be made and other embodiments of the principals of the invention will no doubt occur to those skilled in the art to which the invention pertains. Therefore, it is contemplated by the appended claims to cover any such modifications as incorporate the features of the invention within the true meaning, spirit, and scope of such claims.

What is claimed is:

1. A colored wax composition comprising a wax; and a colorant defined by Formula (I)

$$R\{A[(B)_n R^1]_m\}_x \qquad (I)$$

wherein

R is an organic chromophore;

A is a linking moiety in said chromophore selected from the group consisting of N, O, S, $SO_2N$, and $CO_2$;

B is selected from the group of one or more alkyleneoxy constituents containing from 2 to 4 carbon atoms;

n is an integer of from 2 to about 100;

m is 1 when A is O, S, or $CO_2$, and m is 2 when A is N or $SO_2N$;

x is an integer of from 1 to about 5; and $R^1$ is a $C_8$ to about $C_{20}$ fatty acid moiety;

wherein the colorant is optionally diluted in a diluent surfactant.

2. The wax composition in claim 1 wherein said wax is selected from the group consisting of mineral waxes, animal waxes, vegetable waxes, synthetic waxes, and any mixtures thereof.

3. The wax composition in claim 2 wherein said wax is selected from the group consisting of paraffin wax, montan wax, ozokerite wax, microcrystalline wax, earth wax, beeswax, waspwax, Chinesewax (insectwax), carnauba wax, sugarcane wax, candelilla wax, flax wax, Fischer-Tropsch wax, polyethylene wax, and any mixtures thereof.

4. The wax composition in claim 3 wherein said wax is paraffin wax.

5. The wax composition in claim 1 wherein

R is selected from the group consisting of azo, diazo, disazo, trisazo, diphenylmethane, triphenylmethane, xanthene, nitro, nitroso, acridine, methine, styryl, indamine, thiazole, oxazine, anthraquinone, and any mixtures thereof;

B comprises a mixture of ethyleneoxy and propyleneoxy groups;

n is from about 4 to about 30;

x is 2; and $R^1$ is from $C_{12}$ to $C_8$ fatty acid.

6. The wax composition in claim 5 wherein

R is selected from the group consisting of azo, triphenylmethane, nitro, methine, thiazole, and any mixtures thereof;

B comprises from about 0 to about 50% moles of ethyleneoxy groups and from about 50 to about 100% moles of propyleneoxy groups;

n is from about 8 to about 20; and $R^1$ is from $C_{14}$ to $C_{18}$ fatty acid.

7. The wax composition in claim 6 wherein

B comprises from about 0 to about 40% moles of ethyleneoxy groups and from about 60 to about 100% moles of propyleneoxy groups; and $R^1$ is $C_8$ fatty acid.

8. The wax composition in claim 7 wherein B comprises 100% moles of propyleneoxy groups.

9. A method of producing a colored wax article comprising the sequential steps of (a) providing a solution of molten wax;

(b) introducing into said molten wax a colorant defined by Formula (I)

$$R\{A[(B)_n R^1]_m\}_x \qquad (I)$$

wherein

R is an organic chromophore;

A is a linking moiety in said chromophore selected from the group consisting of N, O, S, $SO_2N$, and $CO_2$;

B is selected from the group of one or more alkyleneoxy constituents containing from 2 to 4 carbon atoms;

n is an integer of from 2 to about 100;

m is 1 when A is O, S, or $CO_2$, and m is 2 when A is N or $SO_2N$;

x is an integer of from 1 to about 5; and $R^1$ is a $C_8$ to about $C_{20}$ fatty acid moiety, to produce a colored wax composition;

(c) pouring said colored wax composition into a mold; and (d) allowing sufficient time for said colored wax composition to cool within said mold.

10. The method of claim 9 wherein said wax is selected from the group consisting of mineral waxes, animal waxes, vegetable waxes, synthetic waxes, and any mixtures thereof.

11. The method of claim 10 wherein said wax is selected from the group consisting of paraffin wax, montan wax, ozokerite wax, microcrystalline wax, earth wax, beeswax, waspwax, Chinesewax (insectwax), carnauba wax, sugarcane wax, candelilla wax, flax wax, Fischer-Tropsch wax, and any mixtures thereof.

12. The method of claim 11 wherein said wax is paraffin wax.

13. The method of claim 9 wherein

R is selected from the group consisting of azo, diazo, disazo, trisazo, diphenylmethane, triphenylmethane, xanthene, nitro, nitroso, acridine, methine, styryl, indamine, thiazole, oxazine, anthraquinone, and any mixtures thereof;

B comprises a mixture of ethyleneoxy and propyleneoxy groups;

n is from about 4 to about 30;

x is 2; and $R^1$ is from $C_{12}$ to $C_{18}$ fatty acid.

14. The method of claim 13 wherein

R is selected from the group consisting of azo, triphenylmethane, nitro, thiazole, and any mixtures thereof;

B comprises from about 0 to about 50% moles of ethyleneoxy groups and from about 50 to about 100% propyleneoxy groups;

n is from about 8 to about 20; and $R^1$ is from $C_{14}$ to $C_{18}$ fatty acid.

15. The method of claim 14 wherein

B comprises from about 0 to about 40% moles of ethyleneoxy groups and from about 60 to about 100% moles of propyleneoxy groups; and $R^1$ is $C_{18}$ fatty acid.

16. The method of claim 15 wherein

B comprises 100% moles of propyleneoxy groups.

17. The method of claim 15 wherein said article is a candle.

18. The method of claim 15 wherein said article is a crayon.

19. The method of claim 9 wherein said article is a candle.

20. The method of claim 9 wherein said article is a crayon.

* * * * *